US009996688B1

(12) United States Patent
    Cavalancia, II (10) Patent No.: US 9,996,688 B1
(45) Date of Patent: Jun. 12, 2018

(54) SYSTEMS AND METHODS FOR CONTROLLING ACCESS TO COMPUTER APPLICATIONS OR DATA

(75) Inventor: Nicholas John Cavalancia, II, Plantation, FL (US)

(73) Assignee: Quest Software Inc., Aliso Viejo, CA (US)

( * ) Notice: Subject to any disclaimer, the term of this patent is extended or adjusted under 35 U.S.C. 154(b) by 599 days.

(21) Appl. No.: 12/914,767

(22) Filed: Oct. 28, 2010

Related U.S. Application Data (60) Provisional application No. 61/256,751, filed on Oct. 30, 2009.

(51) Int. Cl.
    *G06F 21/50*   (2013.01)
    *G06F 21/44*   (2013.01)
    *G06F 21/10*   (2013.01)
    *G06F 21/31*   (2013.01)
    *G06F 21/30*   (2013.01)

(52) U.S. Cl.
    CPC .............. *G06F 21/50* (2013.01); *G06F 21/10* (2013.01); *G06F 21/30* (2013.01); *G06F 21/305* (2013.01); *G06F 21/31* (2013.01); *G06F 21/44* (2013.01)

(58) Field of Classification Search
    CPC .......... G06F 21/50; G06F 21/10; G06F 21/30; G06F 21/305; G06F 21/31; G06F 21/44
    USPC ................................. 726/7, 28, 29
    See application file for complete search history.

(56) References Cited

U.S. PATENT DOCUMENTS

| 6,308,273 B1 | 10/2001 | Goertzel et al. |
| 6,871,221 B1 | 3/2005 | Styles |
| 7,293,087 B2 | 11/2007 | Styles et al. |
| 7,353,262 B2 | 4/2008 | Styles et al. |
| 7,469,278 B2 | 12/2008 | Styles et al. |
| 7,592,906 B1 * | 9/2009 | Hanna et al. ............ 340/506 |
| 7,703,140 B2 | 4/2010 | Nath et al. |
| 7,801,975 B2 | 9/2010 | Styles |
| 8,205,072 B1 * | 6/2012 | Gentil ............ G06F 21/53 713/150 |
| 2003/0065942 A1 * | 4/2003 | Lineman et al. ........... 713/201 |
| 2004/0103317 A1 * | 5/2004 | Burns ..................... 713/201 |
| 2007/0143827 A1 | 6/2007 | Nicodemus et al. |
| 2007/0192453 A1 * | 8/2007 | Copeland et al. ......... 709/223 |
| 2009/0031141 A1 * | 1/2009 | Pearson et al. ........... 713/187 |
| 2009/0247125 A1 | 10/2009 | Grant |

OTHER PUBLICATIONS

"AspenOne Engineering and Microsoft Application Virtualization", Microsoft, 2008.
Coby Gurr, "Facilitating Microsoft Windows Vista Migration Through Application Virtualization", Dell Power Solutions, Feb. 2008.
http://www.scriptlogic.com/products/desktopauthority/walk-through/default.asp?keyframe=link2a, Aug. 9, 2010.

* cited by examiner

*Primary Examiner* — Jeffrey D Popham
(74) *Attorney, Agent, or Firm* — Winstead PC (57) ABSTRACT

Solutions for controlling access to computer applications or data are disclosed. For instance, certain systems advantageously secure access to applications and data by not allowing the file to launch if conditions acceptable to opening the file are not met, even when the user or computer has the authority to access the file. In other instances, certain systems advantageously secure access to applications and data by not allowing the file to launch if the user credentials are not validated, even when the conditions acceptable to opening the file are met.

11 Claims, 10 Drawing Sheets

SYSTEMS AND METHODS FOR CONTROLLING ACCESS TO COMPUTER APPLICATIONS OR DATA

CROSS-REFERENCE TO RELATED APPLICATIONS

This application claims the benefit of priority under 35 U.S.C. § 119(e) of U.S. Provisional Patent Application No. 61/256,751, filed on Oct. 30, 2009 and titled "Systems and Methods for Securing a Virtualized Application," the entirety of which is hereby incorporated herein by reference to be considered part of this specification.

BACKGROUND

Embodiments generally relate to systems and methods for securing a virtualized application and its associated data. Application virtualization generally describes software technologies that improve portability, manageability and/or compatibility of applications by encapsulating them from the underlying operating system of the computing device on which the applications are executed. As a result, the virtualized application(s) are "fooled" at runtime into believing that they are directly interfacing with the computing device's operating system and resources.

Conventional application virtualization systems lack controls to prevent data associated with the virtualized application to be accessible to the outside world. For instance, if a laptop using a virtualized application that accesses confidential social security numbers is stolen, such information when using conventional application virtualization systems may be stored in a public, easily-accessible file.

Other embodiments generally relate to systems and methods for securing an application and its associated data. At logon, logoff, during any event where a configuration change may be needed, such as, for example, refresh, or the like, a computer may be configured with applications and data that the user or the computer is authorized to access. Conventional application configuration systems lack controls to prevent data associated with the applications to be accessible to the outside world. For instance, if a laptop configured with a payroll application at logon is stolen, payroll information when using conventional configuration systems may be accessed prior to logoff without further security measures.

SUMMARY

Systems and methods disclosed herein can be used in a variety of computer environments to secure one or more applications after logon, before logoff and other than during any event where a configuration change may be needed. In certain embodiments, disclosed systems and methods prevent applications and/or data launching when attributes associated with the user, the user's computer, and/or their respective environments, do not satisfy an application access policy. For instance, there may be inadequate download/upload speed due to poor connectivity if the application is launched in the computer's current environment, making the application difficult to use. In another instance, it may be corporate policy to not view the data outside of the corporate walls. In an embodiment, a system administrator defines the attributes that allow each application to open. Other embodiments advantageously prevent access to, and dissemination of, information associated with applications by unauthorized users.

In certain embodiments, disclosed systems and methods prevent virtualized applications and/or virtualized data launching when attributes associated with the user, the user's computer, and/or their respective environments, do not satisfy an application access policy. For instance, certain embodiments store a virtualized application along with its associated registry data and/or file data as a single encrypted file (e.g., a "vault") on an end-user computing device. A virtualization layer detects when a user requests the virtualized application, verifies environmental conditions meet the application access policy, verifies user security, and prevents the virtualized application and/or data from opening when the environmental conditions do not meet the application security policy or the user credentials do not meet the security requirements.

In certain embodiments, a computer executable method in a client-server environment for securing access to an application on at least one client system is disclosed. The method comprises receiving on a client system from a server system one or more file execution conditions based on environmental conditions associated with hardware and software components of the client system. The file execution conditions are independent of user input, and at least one of the file execution conditions is previously set graphically on the server system using a graphical user interface with one or more selectable selections. The method further comprises running a monitoring agent on the client system to detect when the client system has requested access to an authorized application, and in response to the detected access request, determining with the client system whether the one or more file execution conditions are met. The method further comprises automatically requesting from the server system a security file comprising one or more security conditions when the file execution conditions are met, receiving from the user one or more user credentials; and automatically permitting the client system to open the requested application if the one or more received user credentials meet the one or more security conditions.

In certain embodiments, a computer executable method in a client-server environment for securing access to an application on at least one client system is disclosed. The method on the client system comprises receiving on a client system from a server system a first file comprising one or more first environmental conditions, where the first environmental conditions are determined after the client system has started, running a monitoring agent on the client system to detect when a user logon to the client system occurs, and determining, in response to the detected user logon, if the one or more first environmental conditions are met, and if the one or more first environmental conditions are met, automatically authorizing the client system to access at least one application.

The method further comprises receiving on the client system from the server system a second file comprising one or more second environmental conditions. The second environmental conditions are determined after the client system has requested access to the at least one authorized application, are based on hardware and software components of the client system, are independent of user input, and at least one of the second environmental conditions is previously set graphically on the server system using a graphical user interface with one or more user selectable selections. The method further comprises running the monitoring agent on the client system to detect when the client system has requested access to the at least one authorized application, determining, in response to the detected access request, if the one or more second environmental conditions are met, and if the one or more second environmental conditions are met, automatically receiving on the client system from the server system a security file comprising one or more security conditions.

The method further comprises requesting, in response to receiving the security file, one or more user credentials from a user, receiving from the user the one or more user credentials, determining if the one or more received user credentials meet the one or more security conditions, and if the one or more security requirements are met, automatically permitting the client system to open the authorized requested application. The method further comprises running periodically the monitoring agent on the client system to detect whether the opened application is running, where the period is previously set graphically on the server system using the graphical user interface with one or more user selectable selections, determining, in response to the detected running application, if the one or more second environmental conditions are met; and if the one or more second environmental conditions are met, automatically permitting the client system to continue to execute the detected running application.

In certain embodiments, a computer readable storage medium comprising computer executable instructions configured to implement a method for securing access to an application is disclosed. The method on the client system comprises receiving on a client system from a server system a first file comprising one or more first environmental conditions, where the first environmental conditions are determined after the client system has started, running a monitoring agent on the client system to detect when a user logon to the client system occurs, determining, in response to the detected user logon, if the one or more first environmental conditions are met, if the one or more first environmental conditions are met, automatically authorizing the client system to access at least one application and receiving on the client system from the server system a second file comprising one or more second environmental conditions. The second environmental conditions are determined after the client system has requested access to the at least one authorized application, are based on hardware and software components of the client system, are independent of user input, and at least one of the second environmental conditions is previously set graphically on the server system using a graphical user interface with one or more user selectable selections. The method further comprises running the monitoring agent on the client system to detect when the client system has requested access to the at least one authorized application, determining, in response to the detected access request, if the one or more second environmental conditions are met, if the one or more second environmental conditions are met, automatically receiving on the client system from the server system a security file comprising one or more security conditions, requesting, in response to receiving the security file, one or more user credentials from a user, receiving from the user the one or more user credentials, determining if the one or more received user credentials meet the one or more security conditions, and if the one or more security requirements are met, automatically permitting the client system to open the authorized requested application.

For purposes of summarizing the disclosure, certain aspects, advantages and novel features of the embodiments have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments of the invention and not to limit the scope of the disclosure.

DETAILED DESCRIPTION OF THE PREFERRED EMBODIMENT

The features of the inventive systems and methods will now be described with reference to the drawings summarized above.

Figure 1A:
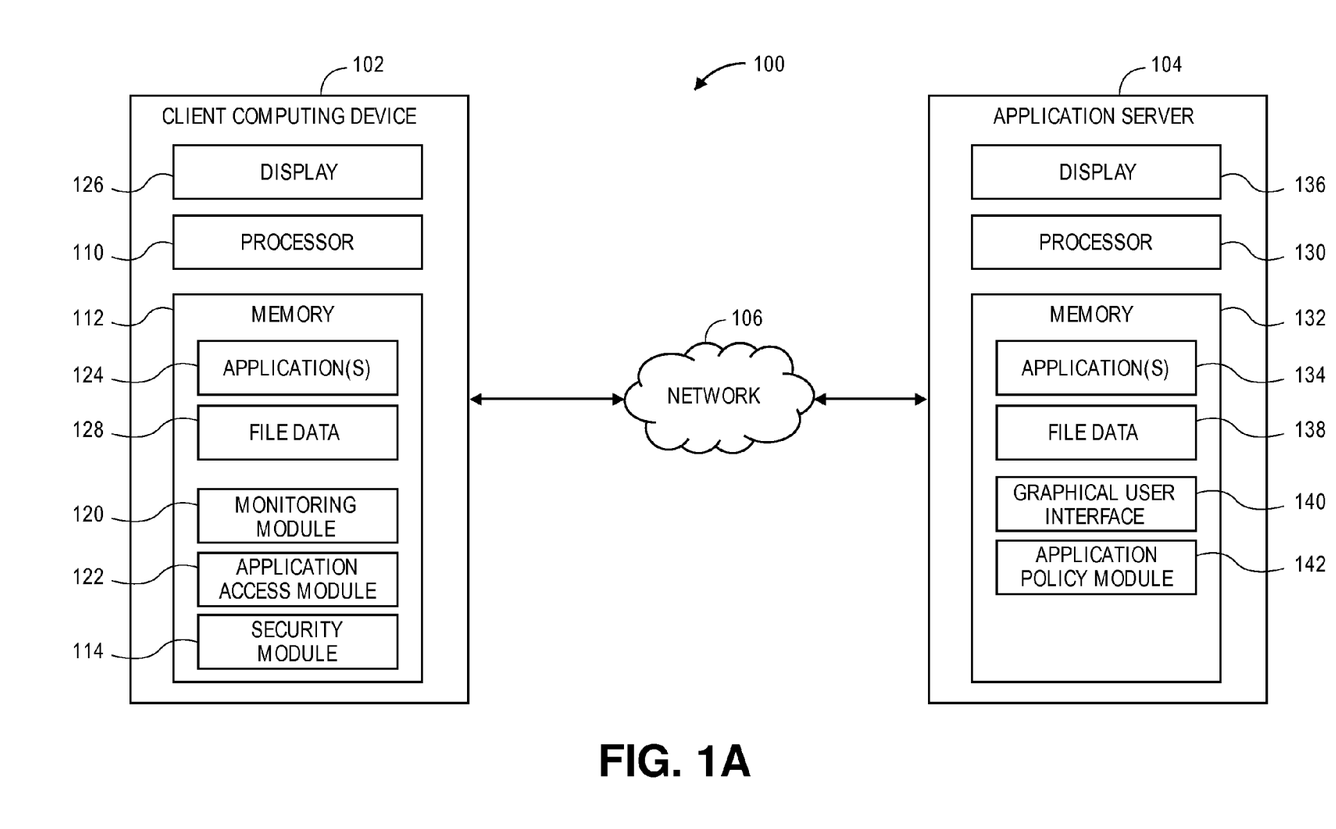
FIG. 1A illustrates a block diagram of a system for controlling access to desktop applications or data, according to certain embodiments.

FIG. 1A illustrates an exemplary embodiment of a system 100 for securing an application and/or data, according to certain embodiments. As illustrated, the system 100 comprises a client computing device 102 that communicates with an application and/or management server 104 through a network 106. In an embodiment, the application server 104 transmits one or more applications through the network 106 to the client computing device 102.

In certain embodiments, the network 106 can comprise a local area network (LAN). In yet other embodiments, the network 106 can comprise one or more of the following communication means: internet, intranet, wide area network (WAN), public network, combinations of the same, or the like. In other embodiments, the network 106 can be any communication system including by way of example, telephone networks, wireless data transmission systems, two-way cable systems, customized computer networks, interactive kiosk networks, interactive television networks, and the like. In addition, connectivity to the network 106 may be through, for example, remote modem, Ethernet, token ring, fiber distributed datalink interface (FDDI), asynchronous transfer mode (ATM), combinations of the same, or the like.

The application and/or management server 104 can comprise any type of computing device capable of transmitting an application to the client computing device 102. In certain embodiments, the application server 104 is configured to virtualize the application. In certain embodiments, the virtualized application, when executed on the client computing device 102, accesses resources and/or data stored on the application server 104. It will also be understood from the disclosure herein that the client computing device 102 and/or the application server 104 can comprise multiple computing devices in communication with each other.

In an embodiment illustrated in FIG. 1A, the application and/or management server 104 comprises one or more computers 130, memory 132, and a display 136. The computers 130 comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers, and the like.

The memory 132 can comprise one or more logical and/or physical data storage systems for storing data and applications used by the application/management server 104. In an embodiment, the memory 132 comprises an application policy module 142, at least one application 134, file data 138, and a graphical user interface (GUI) 140.

In an embodiment, the application policy module 142 comprises an application access policy. In an embodiment, the application access policy is set by a system administrator, such as, for example, an information technology (IT) administrator, or the like, and comprises at least one factor to launch an application. In a further embodiment, the IT administrator determines the at least one factor to launch each application.

In an embodiment, the application server 104 transmits one or more applications 136 and/or file data 138 through the network 106 to the client computing device 102 to be stored on the client computing device 102.

The GUI 140 interfaces with the display 136 and the application policy module 142 to permit the system administrator to set the application access policy. In an embodiment, the factors to launch are conditions associated with the environment of the user and/or the client computing device 102 that, if met, permit the client computing device 102 to launch or open applications and/or data stored locally on the client computing device 102. In an embodiment, the factors to launch are based on environmental conditions associated with the hardware and software components of the client computing device 102.

The client computing device 102 can comprise any type of computing device capable of executing one or more applications. In certain embodiments, the client computing device 102 comprises a desktop or laptop computer. In other embodiments, the client computer 102 can comprise a smartphone, a workstation, a server, a PDA, combinations of the same, or the like.

In an embodiment illustrated in FIG. 1A, the client computing device 102 comprises one or more computers 110, memory 112, and a display 126. The computers 110 comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers, and the like.

The memory 112 can comprise one or more logical and/or physical data storage systems for storing data and applications used by the computing device 102. In one embodiment, the memory 112 comprises one or more application(s) 124, file data 128, an application access module 122, a monitoring module 120, and a security module 114.

In certain embodiments, the application access module 122 comprises at least one factor associated with allowing the user to open or launch the application(s) 124 and/or the file data 128 from the computing device 102.

In certain embodiments, the monitoring module 120 comprises a monitoring agent and detects when a user of the computing device 102 accesses the applications(s) 124 and/or the file data 128. In other embodiments, the monitoring module 120 detects when the computing device 102 executes the application(s) 124 and/or the file data 128.

In certain embodiments, the security module 114 regulates and/or provides user access to the application(s) 124 and/or file data 128, based on proper security identification.

Figure 1B:
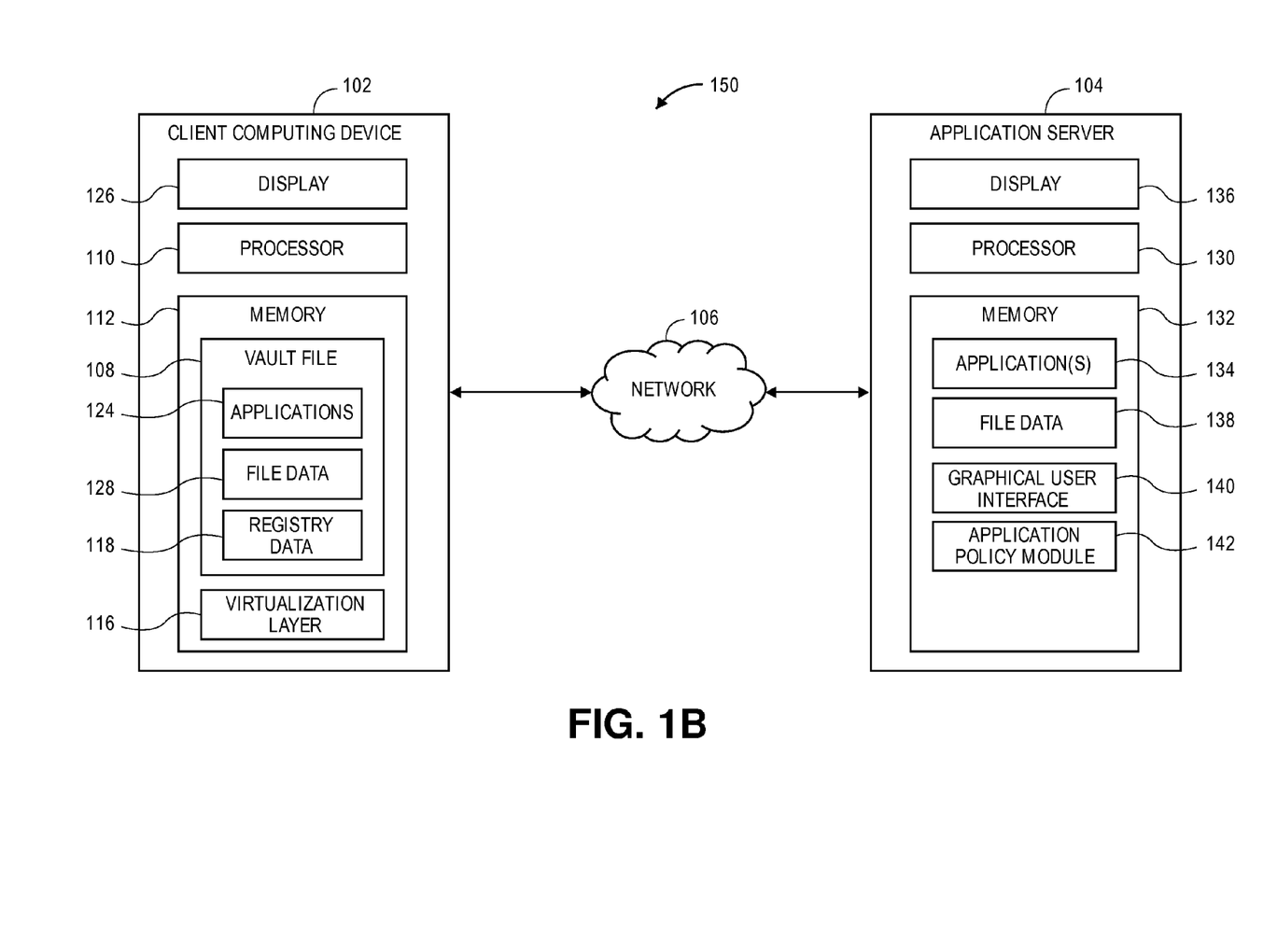
FIG. 1B illustrates a block diagram of a system for controlling access to virtualized desktop applications or data, according to certain embodiments.

FIG. 1B illustrates an exemplary embodiment of a system 150 for securing a virtualized application and/or virtualized data, according to certain embodiments. As illustrated, the system 150 comprises the client computing device 102 that communicates with the application and/or management server 104 through the network 106, as described above with respect to FIG. 1A. In an embodiment, the application server 104 virtualizes one or more applications for delivery to the client computing device 102 through the network 106.

In an embodiment illustrated in FIG. 1B, the application and/or management server 104 comprises the processor 130, the memory 132, and the display as described above with respect to FIG. 1A. Further, the memory 132 comprises the application(s) 134, the file data 138, the graphical user interface 130, and the application policy module 142 as described above with respect to FIG. 1A.

The GUI 140 interfaces with the display 136 and the application policy module 142 to permit the system administrator to set the application access policy. In an embodiment, the factors to launch are conditions associated with the environment of the user and/or the client computing device 102 that, if met, permit the client computing device 102 to launch or open virtualized applications and/or virtualized data on the client computing device 102. In an embodiment, the factors to launch are based on environmental conditions associated with the hardware and software components of the client computing device 102.

In an embodiment illustrated in FIG. 1B, the client computing device 102 comprises the one or more computers 110, and the display 126, as described above with respect to FIG. 1A. The client computing device 102 further comprises the memory 112. The memory 112 can comprise one or more logical and/or physical data storage systems for storing data and applications used by the computing device 102. In one embodiment, the memory 112 comprises a vault file 108 and a virtualization layer 116. In certain embodiments, the vault file comprises an encrypted file with one or more application(s) 124, file data 128, and registry data 118. In an embodiment, the application(s) 124 and the file data 128 comprise virtualized application(s) 124 and virtualized file data 128, respectively.

In an embodiment, the registry data 126 comprises a central hierarchical database used to store information that is necessary to configure the client computing device 102 for one or more users, the virtualized application(s) 124, and hardware devices. The registry information comprises, for example, profiles of each user, the application(s) 124 installed on the computer 102 and the types of documents that each can create, property sheet settings for folders and application icons, what hardware exists on the computing device 102, the ports that are being used, and the like.

In certain embodiments, the virtualization layer 116 is installed on the client computing device 102 and is configured to intercept file and/or registry operations of the virtualized application(s) 124, and transparently redirect these operations to a different location, such as the application server 104. Thus, the virtualization layer can detect and intercept user requests to access the virtualized application(s) and data 128, and as such, comprises the functions of the monitoring module 120. Further, in an embodiment, the virtualization layer 116 can include, or be transmitted with the security requirements, such that the security module 122 is part of the virtualization layer 116. Further yet, the virtualization layer 116 can include, or be transmitted with the at least one factor associated with allowing the user to open or launch the virtualized application(s) 124 and/or the virtualized file data 128 from the computing device 102, such that the virtualization layer 116 comprises the application access module 122. Thus, the virtualization layer comprises the functions for the monitoring module 120, the security module 114, and the application access module 122.

In other embodiments, the virtualization layer 116 can comprise none or some of the functions of the monitoring module 120, the application access module 122, and the security module 114. In an embodiment where the memory 112 comprises the virtualization layer 116 and the virtualization layer comprises none of the functions of the monitoring module 120, the application access module 122, and the security module 114, it is understood that the memory 112 further comprises the monitoring module 120, the application access module 122, and the security module 114. In an embodiment where the memory 112 comprises the virtualization layer 116 and the virtualization layer 116 comprises some of the functions of the monitoring module 120, the application access module 122, and the security module 114, it is understood that the memory 112 further comprises the other of the functions of the monitoring module 120, the application access module 122, and the security module 114.

Figure 2:
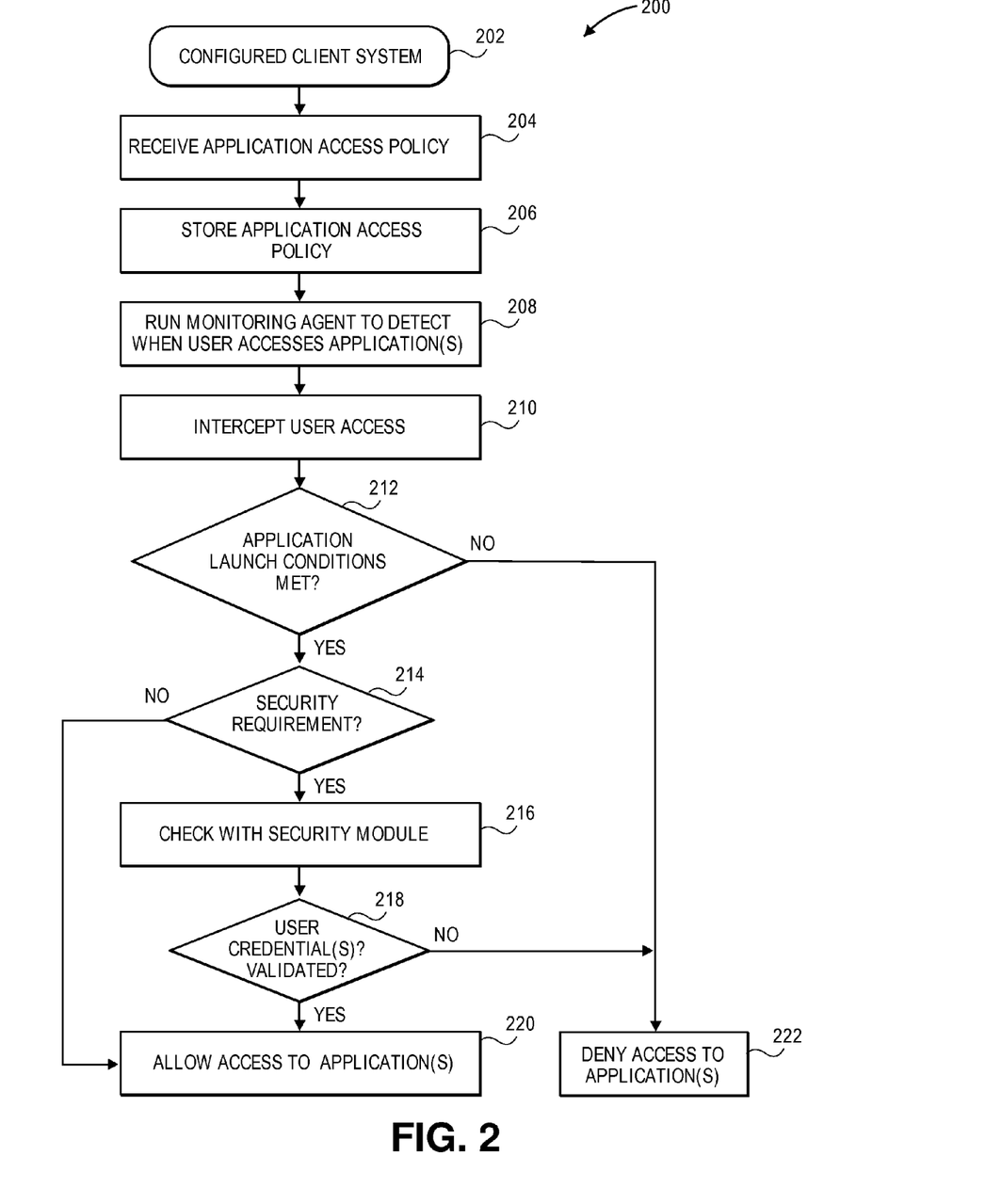
FIG. 2 illustrates a flowchart of an exemplary process for controlling access to desktop applications or data for the systems of FIGS. 1A and 1B, according to certain embodiments.

FIG. 2 illustrates a flowchart of an exemplary access control process 200 for securing access to the local/virtualized application(s) 124 and/or file data 128, according to certain embodiments. For example, the system 100 can use the access control process 200, after log on, before log off, other than during any event, such as refresh, where a configuration change may be needed, or the like, to control whether the application(s) 124 and/or data 128 open or launch. In another example, the system 150 can use the access control process 200, after log on, before log off, other than during any event, such as refresh, where a configuration change may be needed, or the like, to control whether the virtual application(s) 124 and/or virtual file data 128 open or launch. Since, in an embodiment, the virtualization layer 116 of FIG. 1B can comprise the monitoring module 120, the application access module 122, and the security module 114, for exemplary purposes, the processes 200 and 900 will be described with reference to the components of the system 100 of FIG. 1A.

The access control process 200 begins at State 202 where the process 200 performs a desktop management function. In an embodiment, desktop management is a comprehensive approach to managing all of the computers within an organization from a central location. Despite its name, desktop management comprises overseeing laptops and other computing devices, as well as desktops. In certain embodiments, desktop management comprises installing hardware and software, administrating user permissions, filtering, spam filtering, fighting viruses and spyware, controlling greynet applications, and the like, at user logon, user logoff, and during any event, such as refresh, where a configuration change may be needed.

At State 202, the user logs onto the client computing device 102 and the process 200 configures client computing device 102 for use. In an embodiment, the process 200 verifies the user's authority to install or virtualize the application(s) 124 on the user's client computing device 102. In an embodiment, the process 200 configures certain aspects of the client computing device 102 at logoff. In another embodiment, the process 200 configures certain aspects of the client computing device 102 during any event where a configuration change may be needed, such as, for example, refresh, or the like. In an embodiment, the desktop management can be performed by, for example, DESKTOP AUTHORITY, commercially available from Quest Software, Inc. (Aliso Viejo, Calif.).

In another embodiment, the process 200 directs the application/management server 104 to transmit through the network 106 one or more application(s) 134 and/or data 138 that the user is authorized to store in the user's client computing device 102. The client computing device 102 receives the one or more application(s) 134 and/or the file data 138 and locally stores the files as the one or more application(s) 124 and/or the file data 128, respectively.

In another embodiment, the user logs onto the client computing device 102 and the process 200 virtualizes the one or more application(s) 124 and/or the file data 128 through the network 106. In certain embodiments, the virtualization is performed by the application server 104 and/or the client computer 102. For instance, the application(s) 124 can be virtualized on-the-fly as they are transmitted to and/or installed on the client computer 102. Examples of virtualization technologies usable with WINDOWS embodiments of the invention include Ceedo, InstallFree, Citrix XenApp, Novell ZENworks Application Virtualization, Endeavors Technologies Application Jukebox, Microsoft Application Virtualization, Software Virtualization Solution, VMware ThinApp, or the like.

In an embodiment, in State 202, the process 200 stores the virtualized application(s) 124 within the vault file 108. In an embodiment, the vault file 108 is an encrypted file. In certain embodiments, the encrypted vault file 108 also includes the registry data 118 and/or the file data 128 associated with the virtualized application(s) 124. The virtualization layer 116 and the encrypted vault file 108 are then stored on the client computing device 102.

At State 204, the client computing device 102 receives an application access policy from the application server 104 through the network 106. In an embodiment, the application access policy comprises application access data indicative of at least one factor to launch the application(s) 124. In an embodiment, the factors are environmental factors of one or both of the user and the client computing device 102, which, if not met, prevent the application(s) 124 and/or file data 128 from opening or launching. The application access data establish factors that target client computing devices 102 and/or users. The process 200 permits the targeted users and/or client computing devices to open or launch particular application(s) 124 and/or access particular data 128 if the conditions indicated by the factors to launch are met. In an embodiment, a system administrator, such as an IT administrator, decides which factors are required to permit each application 124 and or file data 128 to be opened. In other words, in one embodiment, the IT administrator dictates what conditions are required in order for the client computing device 102 to launch the application 124 and/or file data 128, after logon, before logoff, and other than during any event, such as refresh, where a configuration change may be needed.

The factors to launch an application can be, for example, class of machine, operating system, connection type, group information, computer information, terminal services, custom validation functions and/or variables, timing and event information, combinations of the same, and the like. Each of these factors can be further divided into subgroups. For example, the class of machine factor can be, for example, divided into desktop, portable, tablet PC, embedded, terminal server client, member server, domain control, combinations of the same, and the like.

Further, the factors or conditions can be logically connected using Boolean operators, such as AND, OR, NOT, NOR, and NAND. By logically chaining a set of environmental factors associated with the user and/or the client computing device 102 with the Boolean operators, the process 200 can target narrowly or broadly. For example, logically ANDing the factors, such as, a desktop machine running Windows Vista on a LAN within the Accounting Group located in Building A having a media access control (MAC) address of 00-2f-53-de-76-f3 can target a specific user or client computing device 102. On the other hand, the IT administrator can target the entire organization by selecting, for example, the site address as the application access policy. The Boolean operators in combination with the environmental factors provide the flexibility to target a particular person or client computing device 102, a group or groups of users, or the entire organization. Table 1 comprises a non-exhaustive list of application access data or factors that can be considered in defining the application access policy.

TABLE 1

Application Access Data

| Class of Machine | Computer Domain | Connection Type |
|---|---|---|
| Desktop | Computer Group | LAN |
| Portable | Organizational Unit- | Dial Up |
| Tablet PC | computer | Wireless |
| Embedded | Organizational Unit-user | Terminal Services |
| Terminal server | Primary group | TS application |
| client | Site | name |
| Member server | User Group | TS client name |
| Domain control | User Name | TCP/IP address |
| Operating System | Computer Information | TS initial program |
| Windows | Computer name | TS session name |
| 95 | Host address | Custom Validation |
| 98 | MAC address | Custom function |
| Me | TCP/IP address | Custom variable |
| NT | File exists | Timing and Events |
| 2000 | File version | Frequency |
| XP | IP v4 range | Time range |
| 2003 | IP v6 range | Boolean Functions |
| Vista | Registry key exists | AND |
| 2008 | Registry value | OR |
| LINEX | exists | NAND |
| UNIX | Virtual environment | NOR |
| MAC | Platform type | NOT |

In an embodiment, a system administrator, such as, for example, an IT administrator, determines the application access policy using the graphical user interface 140 and the display 136 at the application server 104. In an embodiment, a unique application access policy can be created for each application 124 and/or file data 128. FIGS. 3-7 illustrate exemplary screen shots of an administrator interface for creating an application access policy.

Figure 3:
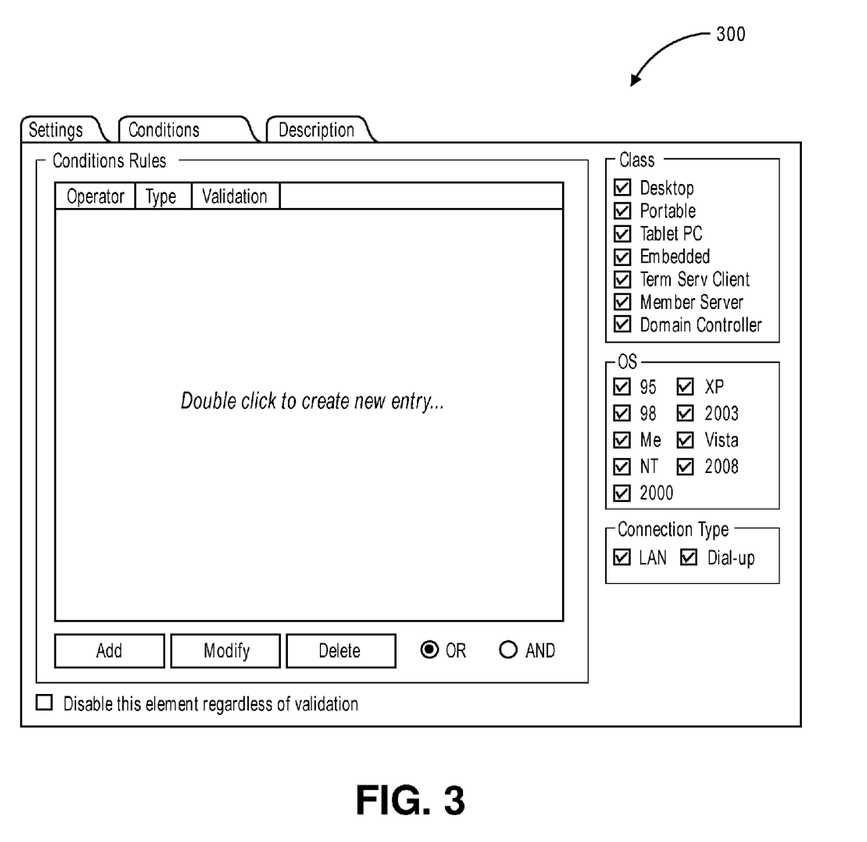
FIGS. 3-7 illustrate exemplary screen shots of an administrator interface for creating an application access policy, according to certain embodiments.
Figure 4:
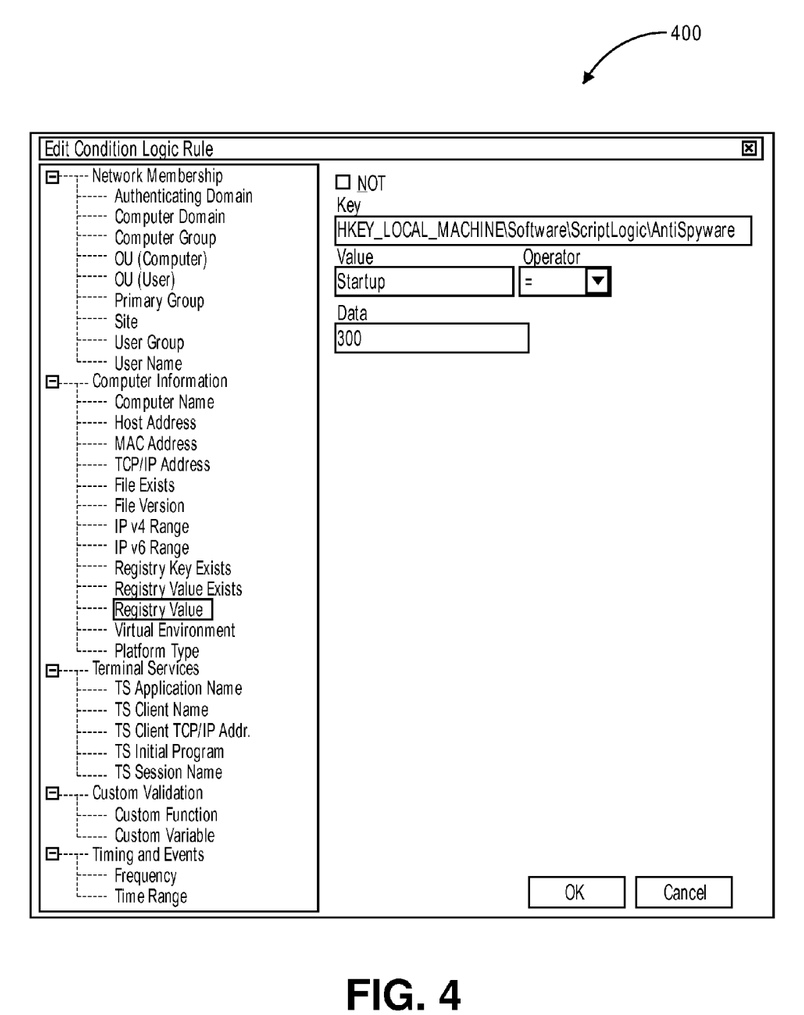

FIG. 3 illustrates an embodiment of an administrator interface 300 for selecting a class, an operating system, and a connection type. FIG. 4 illustrates an embodiment of an administrator interface 400 for selecting network membership factors, computer information, terminal type, and timing and event information. Further the administrator interface 400 allows the administrator to select a custom environmental function or variable, which if not met, prevents the user from accessing the application(s) 124 and/or file data 128.

An example of a custom environmental function is a company policy that denies access to payroll data outside the company's premises. For example, a user who has the authority to access the payroll data, as determined at logon, logoff, or during any event, such as refresh, where a configuration change may be needed, may not be permitted to open or launch the payroll application 124 or payroll data 128 if the environmental factors to launch are not met. In such a case, a remote user will not be permitted to open or launch the payroll data even if the user, upon log on, upon logoff, or during a configuration change, is authorized to access the payroll data. In other words, a user who has the authority to access the payroll data will be denied access to the data if the launch condition, which in this example is a location within the company premises of the user's computing device 102, is not met. Thus, the process 200 maintains the security of the payroll data 128.

Another example of a custom environmental factor is a requirement that the user's computing device 102 have sufficient strength to maintain a wireless connection to the application server 104 to access the virtualized application(s) 124 and/or the virtualized file data 128. In this example, a user opening or launching the virtualized application(s) 124 and/or the virtualized file data 128 from a wireless connection will not be permitted to open the virtualized application(s) 124 and/or the virtualized file data 128 if the signal strength is insufficient to maintain the connection, even if the desktop management function determined upon logon, logoff, or during a configuration change that the user has the authority to access the virtualized application(s) 124 and/or the virtualized file data 128. Thus, the process 200 maintains the security of the virtualized application(s) and/or the virtualized file data 128. In an embodiment, the signal strength value sufficient to maintain the connection is determined by the system administrator.

Figure 5:
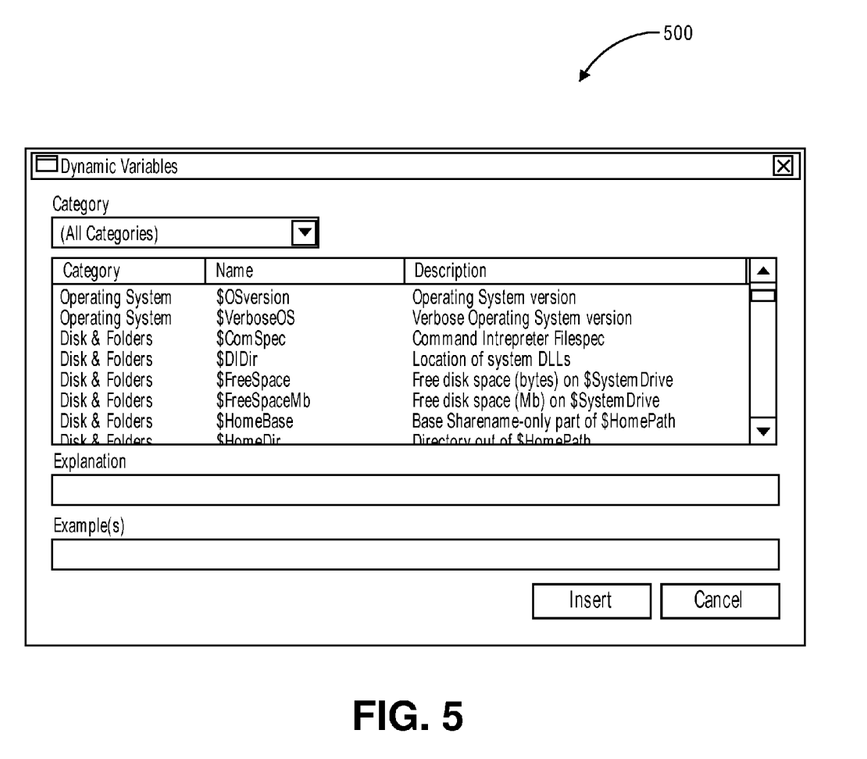
Figure 6:
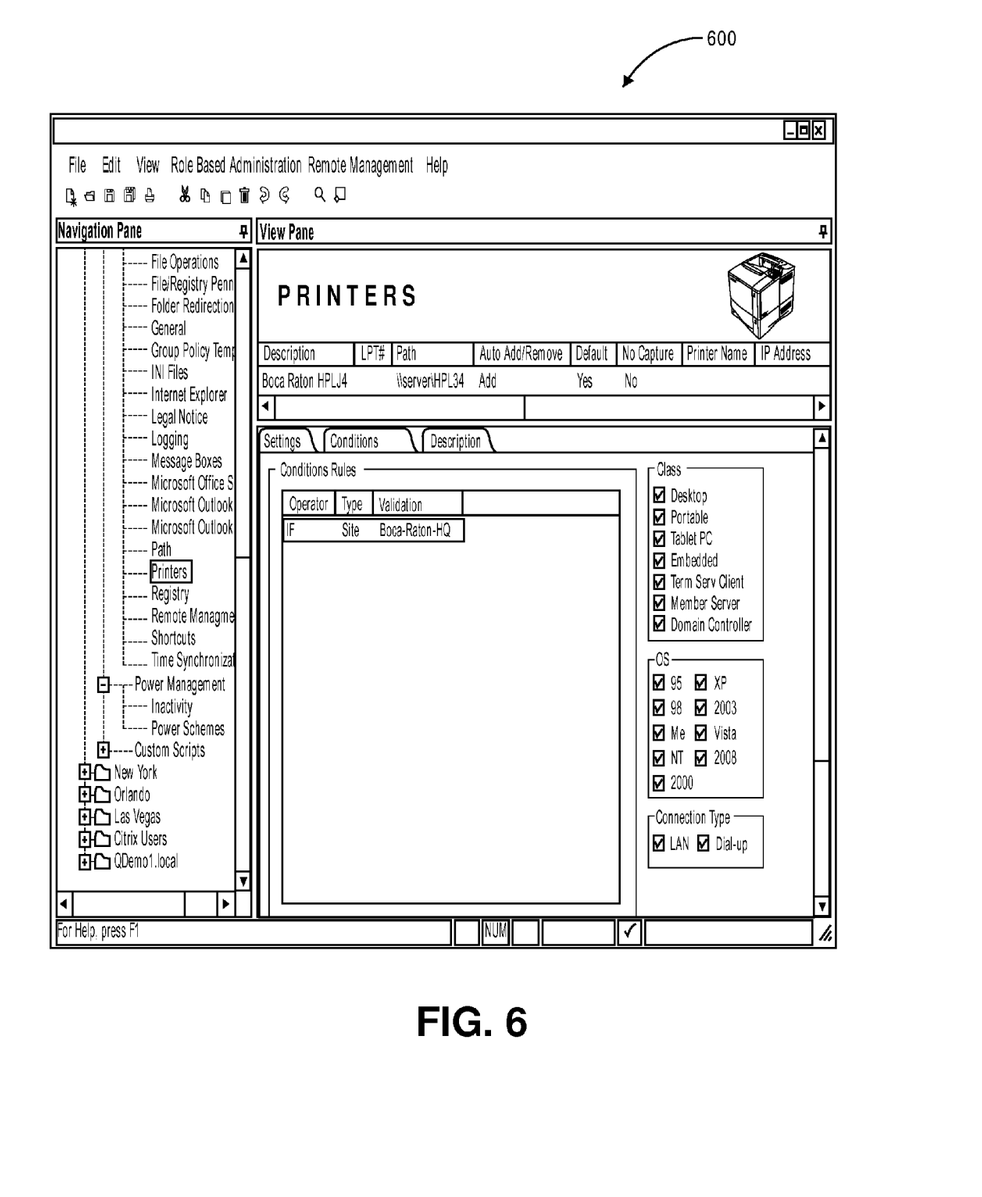
Figure 7:
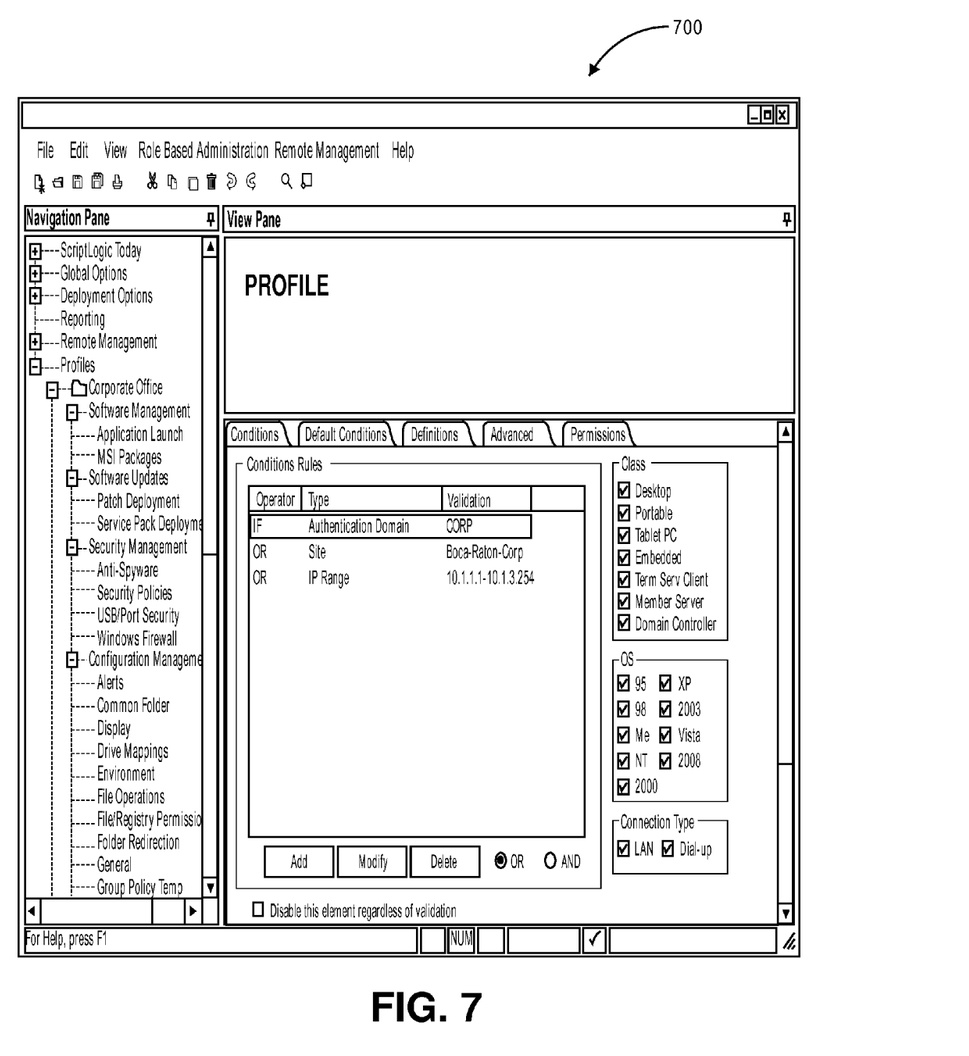

FIG. 5 illustrates an embodiment of an administrator interface 500 for selecting dynamic variables. FIG. 6 illustrates an embodiment of an administrator interface 600 for selecting individual configuration elements. FIG. 7 illustrates an embodiment of an administrator interface 700 for selecting profiles, which group the environmental factors together to target subgroups within the organization.

At State 206 the client computing device 102 stores the application access policy in the application access module 122.

At State 208, the client computing device 102 runs the monitoring module 120 to detect when a user initiates access to the application(s) 124 and/or file data 128. In an embodiment, the monitoring module 120 detects function calls, messages or events passed between software components that are associated with the user request to launch or open the application(s) 124 and/or file data 128. At State 210, the process 200 intercepts the function calls, messages or events associated with the user request to launch or open at least one of the application(s) 124 and/or file data 128. In an embodiment, the process 200 hooks a user input to launch or open at least one of the application(s) 124 and/or file data 128.

At State 212, the process 200 reads, from the application access module 122, the application access policy for the application(s) 124 associated with the intercepted user request and determines whether the factors to launch the application(s) 124 and/or file data 128 are met. If the factors to launch the application 124 and/or file data 128 are not met, the process 200 prevents the application 124 and/or file data 128 from opening or launching, thus securing the application(s) 124 and/or file data 128 in State 222. The client computing device 102 optionally notifies the user that the user has been denied access to the application(s) 124 and/or the file data 128. The notification can be on the display 126, from a printout, audibly, combinations of the same, or the like.

If the conditions to launch the application(s) 124 and/or file data 128 are satisfied, then, in optional State 214, the process 200 determines whether there is a security requirement for the user to be able to open or launch the application 124 and/or access the file data 128. In an embodiment, the client computing device 102 comprises the security module 114 for regulating and/or providing user access to the application(s) 124 and/or file data 128.

In another embodiment, the virtual application(s) 124, and/or the file data 128 are within the vault file 108, as described above, that requires a user requesting the virtual application(s) 124 and/or file data 128 to provide appropriate security identification. In an embodiment, the client computing device 102 comprises the security module 114 for regulating and/or providing user access to the vault file 108, and therefore the virtual application(s) 124 and/or file data 128, based on proper security identification. In another embodiment, the virtualization layer 116 comprises the functions of the security module 114 for regulating and/or providing user access to the vault file 108, and therefore the virtual application(s) 124 and/or file data 128, based on proper security identification.

Figure 8:
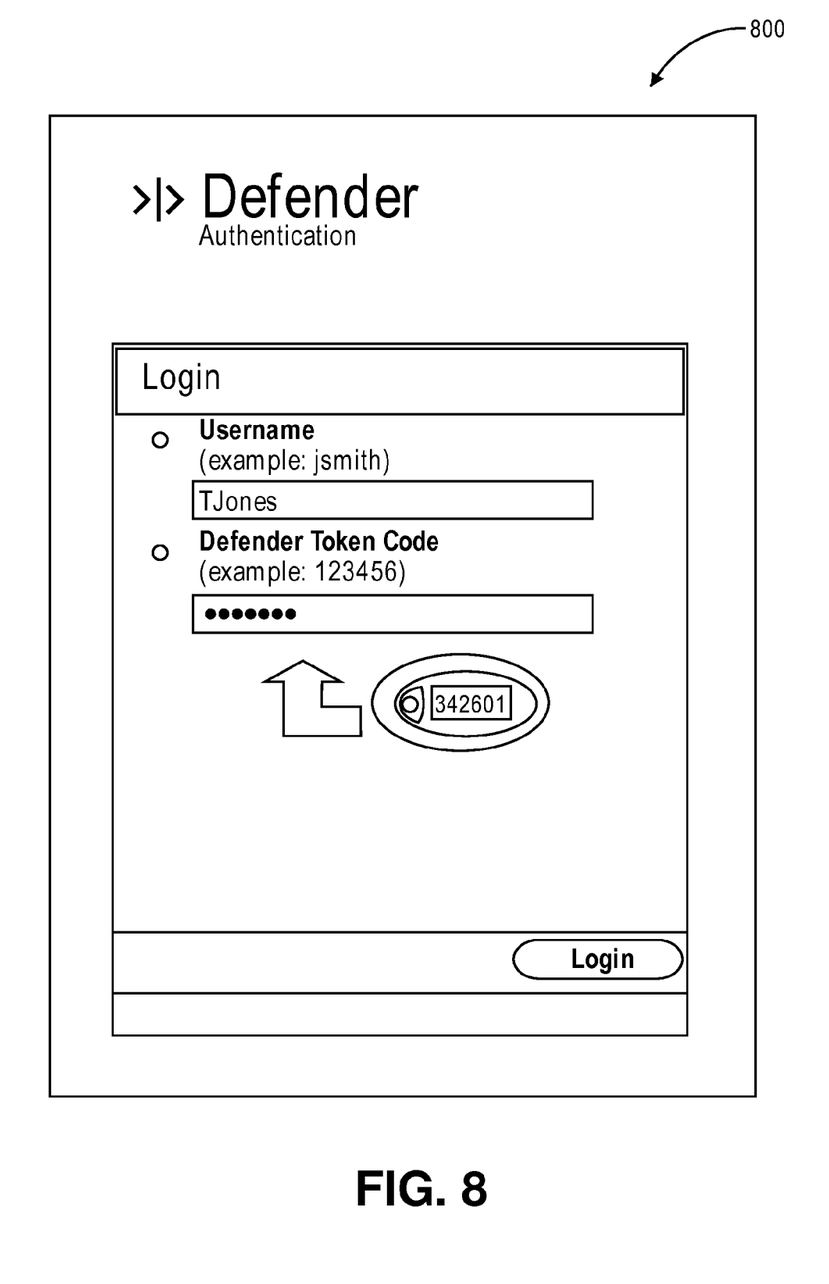
FIG. 8 illustrates an exemplary screen shot of a user interface for authenticating or validating a user credential, according to certain embodiments.

If there is a security requirement, then at optional State 216, the security module 114 determines if the user is allowed to open or launch the requested application(s) 124. For instance, the security module 114 can utilize an NTLM security service, eDirectory, Red Hat, Open Directory, Apache, Oracle, a Kerberos-based security service, a single sign-on service, combinations of the same, or the like to validate user credential(s). In other embodiments, the security module 114 can use one or more authentication/validation technologies, such as, username and/or password (e.g., separate from the user's WINDOWS credentials); a directory system (e.g., Active Directory) that identifies which user(s) can access specific application(s) 124 based on their directory credentials; a metadirectory service (e.g., single sign-on system) such as, for example, ONE IDENTITY SOLUTION commercially available from Quest Software, Inc. (Aliso Viejo, Calif.); and/or a strong authentication device, such as a token, biometric scanner, RFID card or other like device that requires physical access by the user (e.g., QUEST DEFENDER commercially available from Quest Software), and the like. FIG. 8 illustrates an exemplary screen shot of a user interface 800 for authenticating or validating a user credential using a token having a token code.

In optional State 218, if the user credential(s) are not validated, then, at State 222, the process 200 prevents the application(s) 124 and/or file data 128 from launching or opening. The client computing device 102 optionally notifies the user that the user has been denied access to the application(s) 124 and/or the file data 128. The notification can be on the display 126, from a printout, audibly, combinations of the same, or the like.

If the user credentials are validated at State 218, or if the factors to launch the application(s) 124 and/or the file data 128 are satisfied at State 212 and there is not a security requirement at State 214, the process 200 permits the requested applications(s) 124 and/or file data 128 to launch or open at State 220.

Figure 9:
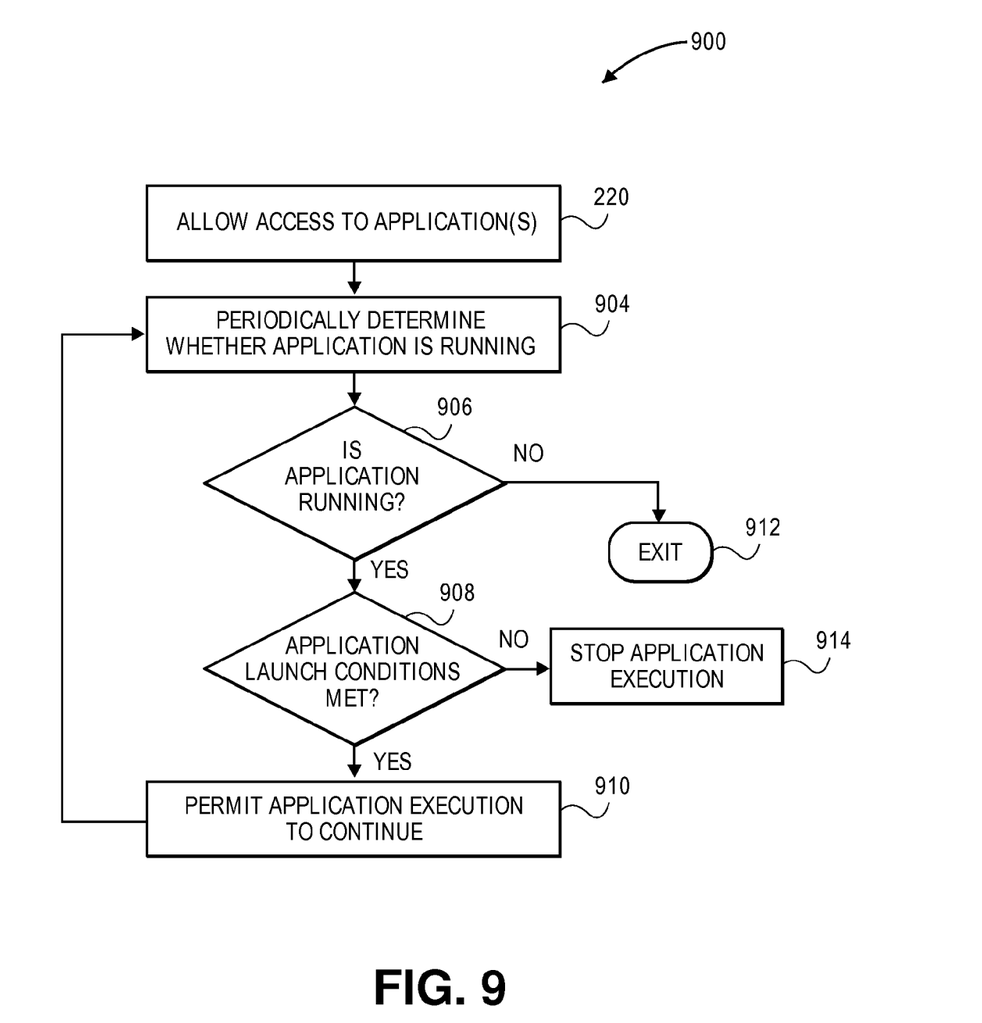
FIG. 9 illustrates a flowchart of an exemplary process for controlling continued access to desktop applications or data for the systems of FIGS. 1A and 1B, according to certain embodiments.

FIG. 9 illustrates a flowchart of an exemplary process 900 for controlling continued access to desktop applications or data for the systems of FIGS. 1A and 1B. In an embodiment, the process 900 is optional. The optional process 900 periodically verifies that the environmental conditions that permitted the application(s) 124 and or file data 128 to open continue to be met during the execution of the application(s) 124. Beginning at State 220 of FIG. 2, the process 200 permits the application(s) 124 to open after verifying that the client computing device 102 meets the environmental conditions in the application access policy and optionally, that the user credentials meet the security requirements.

At State 904, the monitoring module 120 periodically detects whether the application(s) 124 and/or the file data 128 are still executing. In an embodiment, the period is set by the system administrator, such as an IT administrator, using the graphical user interface 140 and the display 136 at the application server 140. In an embodiment, application access policy comprises the period information.

If, at State 906, the application(s) 124 and/or the file data 128 are closed, the process 900 exits at State 912. If, at State 906, the client computing device 102 is executing the application(s) 124 and/or the file data 128, the process 900 reads, from the application access module 122, the application access policy for the application(s) 124 associated with the detected execution. In an embodiment, the application(s) 124 and/or the file data 128 comprise virtualized application(s) 124 and/or virtualized file data 128.

At State 908, the process 900 determines whether the factors to launch the application(s) 124 and/or file data 128 are met. If the factors to launch the application 124 and/or file data 128 are not met, the process 900 stops the application 124 and/or file data 128 from executing, thus securing the application(s) 124 and/or file data 128 at State 914. The client computing device 102 optionally notifies the user that the user has been denied further access to the application(s) 124 and/or the file data 128. The notification can be on the display 126, from a printout, audibly, combinations of the same, or the like.

If the conditions to launch the application(s) 124 and/or file data 128 are satisfied, at State 910, the process 900 permits the client computing device 102 to continue executing the application(s) 124 and/or file data. The process 900 then loops back to State 904 to again periodically detect whether the application(s) 124 and/or file data are still executing.

Desktop management, at logon, logoff, during any event where a configuration change may be needed, such as, for example, refresh, or the like, provides a first level of security to confidential or sensitive information by downloading application(s) 124 and/or file data 128 or virtualizing application(s) 124 and/or file data 128 to users authorized to access the information. Embodiments of the process 200 advantageously provides additional security for confidential or sensitive information by preventing the application(s) 124 and/or file data 128 from launching or opening if factors to launch are not met, even if the user and/or the client computing device 102 is authorized to access the application 124 and/or file data 128. In an embodiment, the factors to launch are determined by a system administrator creating an application access policy from a central location. In an embodiment, each application can be associated with a unique combination of factors to launch. The factors to launch can narrowly target a particular user or client computing device 102, less narrowly target a group or groups of users or computing devices 102, broadly cover the organization, or the like.

Other embodiments of the process 200 advantageously provide additional security to confidential or sensitive information by validating user credentials before allowing the application 124 or the file data 128 to open, even if the factors to launch the application 124 or the file data 128 are met.

In another embodiment, the process 200 provides additional security for the application(s) 124 and file data 128 independent of the technology used to virtualize the application(s) 124. Moreover, use of the application access module 122 to regulate application opening allows for an administrator to have centralized control over managing such access.

In other embodiments, the process 900 advantageously provides additional security for the application(s) 124 and file data 128 by periodically determining if the factors to launch the application(s) 124 and file data 128 continue to be met. If the factors to launch are not met during execution, the process 900 stops the execution of the application(s) 124 and file data 128.

Although certain embodiments of the invention have been described with reference to a WINDOWS infrastructure, it will be understood from the disclosure herein that other embodiments of the invention can function within a LINUX, UNIX, MAC framework, or the like.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer executable method in a client-server environment for securing access to a virtualized application on at least one client system, the method on the client system comprising:
   receiving via a network on a client system from a server system a first file comprising one or more first environmental conditions, wherein the first environmental conditions are determined after the client system has started;
   running a monitoring agent at a virtualization layer on the client system to detect when a user logon to the client system occurs;

verifying, in response to the detected user logon, whether the one or more first environmental conditions are met;

authorizing, in response to the one or more first environmental conditions being met, the client system to access a virtualized application;

storing the authorized virtualized application and associated data in memory of the client system as an encrypted file;

wherein the virtualization layer encapsulates the stored authorized virtualized application from an operating system of the client system on which the stored authorized virtualized application is executed and intercepts and redirects at least one of file operations and registry operations of the stored authorized virtualized application;

receiving via a network on the client system from the server system a second file comprising one or more second environmental conditions;

wherein the second environmental conditions are determined after the client system has requested access to the stored authorized virtualized application, wherein the second environmental conditions are based on hardware and software components of the client system, wherein the second environmental conditions are independent of user input, and wherein at least one of the second environmental conditions is previously set graphically on the server system using a graphical user interface with one or more user selectable selections;

running the monitoring agent at the virtualization layer on the client system to detect when the client system has requested access to the stored authorized virtualized application;

determining, in response to the detected access request, whether the one or more second environmental conditions are met;

receiving, in response to the one or more second environmental conditions being met, on the client system from the server system a security file comprising one or more security conditions;

requesting, in response to receiving the security file, one or more user credentials from a user;

receiving from the user the one or more user credentials;

determining whether the one or more received user credentials meet the one or more security conditions;

automatically permitting the client system to launch the stored authorized virtualized application when the one or more security conditions are met;

periodically detecting whether the launched virtualized application is executing, wherein the period is previously set graphically on the server system using the graphical user interface with one or more user selectable selections;

determining, in response to the detected running virtualized application, whether the one or more second environmental conditions are met; and automatically permitting the detected executing virtualized application to continue to execute when the one or more second environmental conditions are met.

2. The method of claim 1 further comprising automatically preventing the client system from launching the stored authorized virtualized application when the one or more second environmental conditions are not met.

3. The method of claim 1 further comprising automatically preventing the client system from launching the stored authorized virtualized application when the one or more security conditions are not met.

4. The method of claim 1, wherein the second environmental conditions are selected from the group consisting of class of machine, operating system, connection type, computer information, terminal services, custom validation functions, timing information, and event information.

5. The method of claim 1, wherein the second environmental conditions are selected from the group consisting of computer domain, computer group, computer organizational unit, user organizational unit, primary group, site, user group, and user name.

6. The method of claim 1 further comprising automatically stopping the detected executing virtualized application when the one or more second environmental conditions are not met.

7. A non-transitory computer readable storage medium comprising computer executable instructions configured to implement a method in a client-server environment for securing access to a virtualized application on at least one client system, the method on the client system comprising:

receiving via a network on a client system from a server system a first file comprising one or more first environmental conditions, wherein the first environmental conditions are determined after the client system has started;

running a monitoring agent at a virtualization layer on the client system to detect when a user logon to the client system occurs;

verifying, in response to the detected user logon, whether the one or more first environmental conditions are met;

authorizing, in response to a first environmental condition being met, the client system to access a virtualized application;

storing the authorized virtualized application and associated data in memory of the client system as an encrypted file;

wherein the virtualization layer encapsulates the stored authorized virtualized application from an operating system of the client system on which the stored authorized virtualized application is executed and intercepts and redirects at least one of file operations and registry operations of the stored authorized virtualized application;

receiving via a network on the client system from the server system a second file comprising one or more second environmental conditions;

wherein the second environmental conditions are determined after the client system has requested access to the stored authorized virtualized application, wherein the second environmental conditions are based on hardware and software components of the client system, wherein the second environmental conditions are independent of user input, and wherein of the second environmental conditions is previously set graphically on the server system using a graphical user interface with one or more user selectable selections;

running the monitoring agent at the virtualization layer on the client system to detect when the client system has requested access to the stored authorized virtualized application;

determining, in response to the detected access request, whether the one or more second environmental conditions are met;

receiving, in response to a second environmental condition being met, on the client system from the server system a security file comprising one or more security conditions;

requesting, in response to receiving the security file, one or more user credentials from a user;

receiving from the user the one or more user credentials;

determining whether the one or more received user credentials meet the one or more security conditions;

automatically permitting the client system to open the stored authorized virtualized application when the one or more security requirements are met;

periodically detecting whether the opened virtualized application is running, wherein the period is previously set graphically on the server system using the graphical user interface with one or more user selectable selections;

determining, in response to the detected running virtualized application, whether the one or more second environmental conditions are met; and automatically permitting the client system to continue to execute the detected running virtualized application when the one or more second environmental conditions are met.

8. The medium of claim 7 further comprising automatically preventing the client system from opening the stored authorized virtualized application when the one or more second environmental conditions are not met.

9. The medium of claim 7 further comprising automatically preventing the client system from opening the stored authorized virtualized application when the one or more security requirements are not met.

10. The medium of claim 7, wherein the second environmental conditions are selected from the group consisting of computer name, host address, media access control (MAC) address, transmission control protocol/Internet protocol (TCP/IP) address, file existence, file version, IP v4 range, IP v6 range, registry key existence, and registry value.

11. The medium of claim 7 further comprising automatically stopping the client system from executing the detected running virtualized application when the one or more second environmental conditions are not met.

* * * * *